Nov. 9, 1943.   J. C. BARR   2,333,972
REMOTE CONTROL FOR MOVING PICTURE CAMERAS
Filed May 5, 1941   2 Sheets-Sheet 2

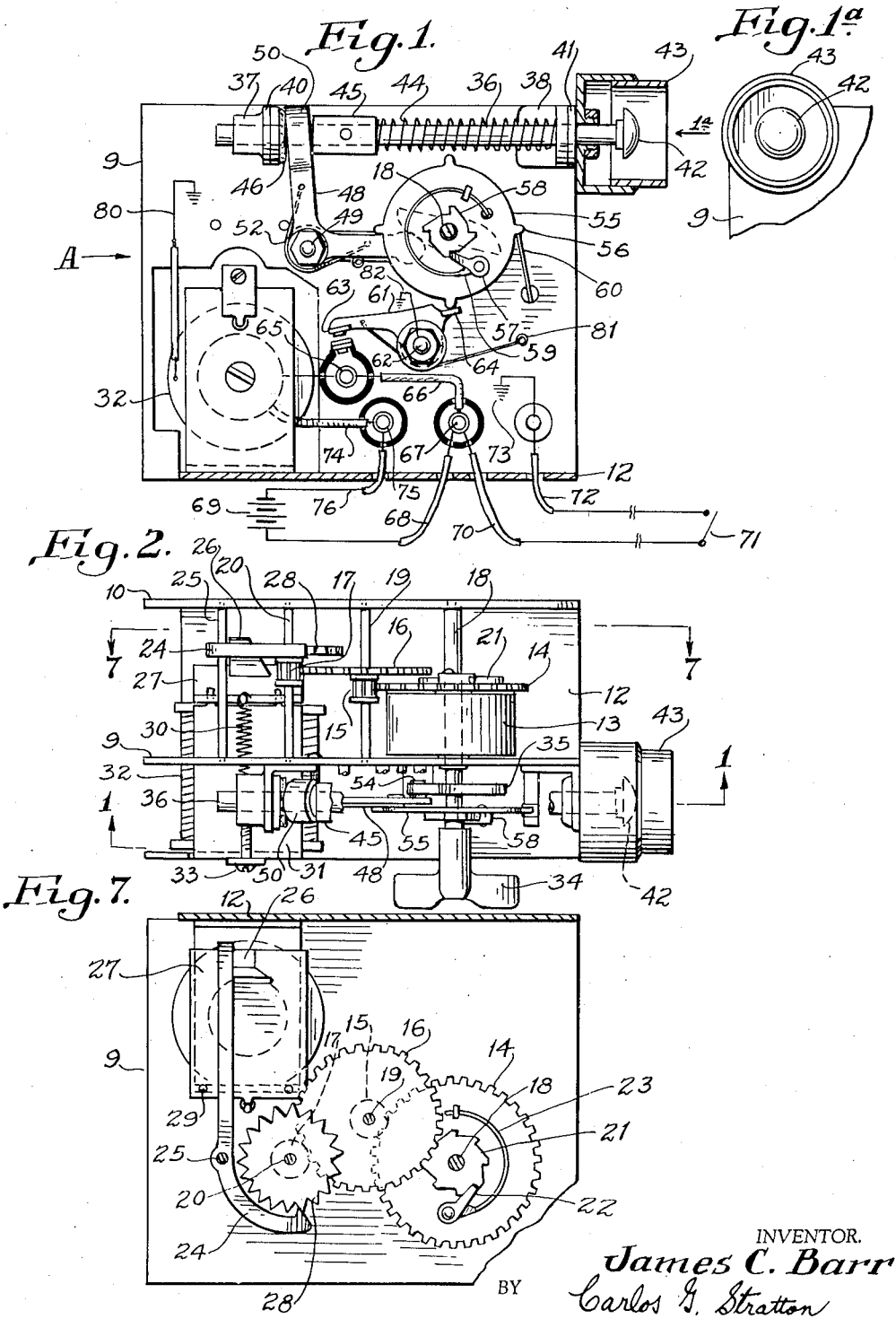
Nov. 9, 1943.  J. C. BARR  2,333,972
REMOTE CONTROL FOR MOVING PICTURE CAMERAS
Filed May 5, 1941  2 Sheets—Sheet 1
INVENTOR.
James C. Barr
BY Carlos G. Stratton
ATTORNEY.

INVENTOR.
James C. Barr
BY Carlos G. Stratton
ATTORNEY.

Patented Nov. 9, 1943

2,333,972

UNITED STATES PATENT OFFICE 2,333,972

REMOTE CONTROL FOR MOVING PICTURE CAMERAS

James C. Barr, Huntington Park, Calif.

Application May 5, 1941, Serial No. 391,857

3 Claims. (Cl. 161—1)

My invention relates to a shutter operating means that may be actuated by a remote control, and the principal object is to provide such remote control for a moving picture camera.

Another object of my invention is to provide means in such a control which will complete the cycle of operation once it has been started manually by the operator.

Still another object is to provide such a mechanism that will permit the shutter of the camera to be closed by a quick retraction of the operating part of the present mechanism.

My invention also has for its objects to provide such means that is positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a sectional view, partly diagrammatic, showing an embodiment of the present invention, taken on the line 1—1 of Fig. 2.

Fig. 1a is a broken view, looking in the direction of the arrow 1a of Fig. 1.

Fig. 2 is a plan view looking down on the mechanism as shown in Fig. 1.

Figures 3, 4, 5, 6:
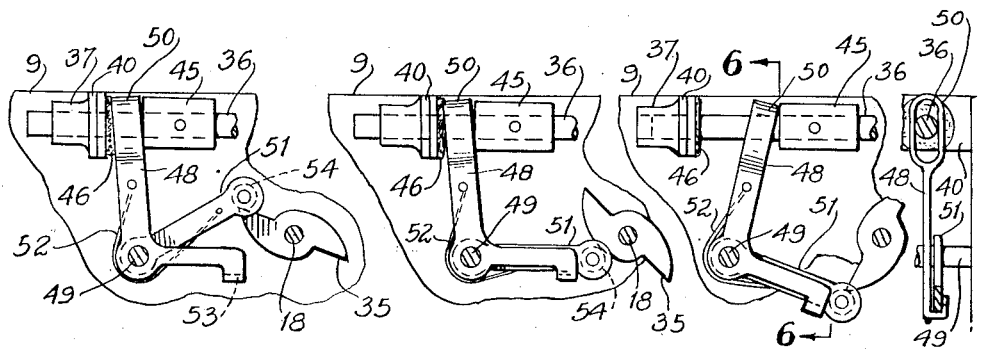

Fig. 3, Fig. 4, and Fig. 5 are broken, sectional elevations showing successive steps in the operation of a part of the present mechanism.

Fig. 6 is a sectional elevation taken on the offset line 6—6 of Fig. 5.

Fig. 7 is a view looking in the opposite direction from Fig. 1, taken on the line 7—7 of Fig. 2.

Figure 8:
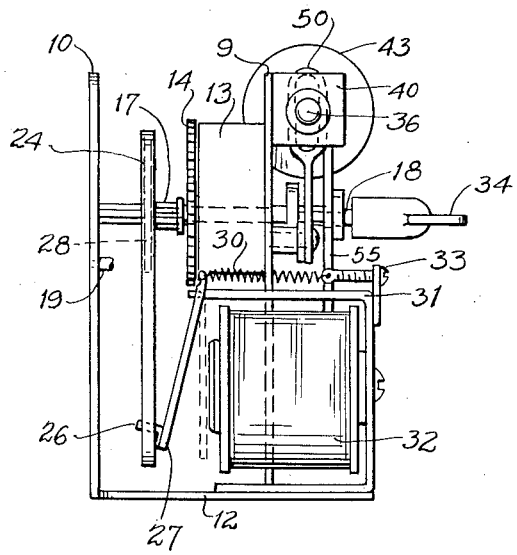

Fig. 8 is a side elevation looking in the direction of the arrow A of Fig. 1.

Referring more in detail to the drawings, the reference numerals 9 and 10 generally designate substantially parallel plates of a frame that is provided with a side member 12. The plates 9 and 10 afford bearings for spindles and shafts hereinafter more fully described.

Motive power for actuating a shutter control is provided by means of a coiled clock spring 13. A train of gears 14, 15, 16, 17 and 28 are connected to be driven by the coil spring 13. The spring 13 and gear 14 are connected to a shaft 18. The gears 15 and 16 are mounted on a spindle 19, and the gears 17 and 28 are mounted on a spindle 20. A ratchet 21 is also mounted on the shaft 18. The gear 14 is loose on the face 18, but connected to be driven by rotation of the shaft 18 in a clockwise direction, by reason of ratchet 21, as shown in Fig. 7. A dog 22 mounted on the gear 14 is urged into engagement with the ratchet 21, by means of a spring 23.

Motive power produced by the coil spring 13 through said train of gears is controlled by an escapement 24 pivoted on a pin 25 between the plates 9 and 10.

The escapement 24, which oscillates about the pin 25, is held in check by a trigger 26 on an armature 27. Fingers 29 project through the armature 27 adjacent an edge thereof. The pins 29 have a sufficiently loose connection with the armature 27 to permit oscillation of the armature 27 from the full line position to its broken line position and back to its original position, as shown in Fig. 8. A helical spring 30 tends to move the armature 27 to its full line position, shown in Fig. 8. The pins 29 are integral with the mounting frame 31 supporting a solenoid 32. An adjusting screw 33 is connected to alter the tension of the helical spring 30.

The shaft 18 extends through the plate 9 and carries a winding key 34 on the opposite side of the plate 9 from the coil spring 13 and the hereinbefore described train of gears. A double faced driving cam 35 is fastened upon the shaft 18. A bar 36 for operating a shutter control mechanism is mounted to reciprocate within bearings 37 and 38, which are supported on the plate 9 by means of lugs 40 and 41, respectively. A head 42 is arranged on the end of the bar 36. The head 42 may actuate a lever, bell crank, or other suitable means for operating the shutter of a moving picture camera. It is believed clear without further illustration that the reciprocation of the bar 36 may be utilized by such lever or bell crank means to operate such a shutter. A hood 43 is shown enclosing the head 42 of the bar. This hood 43 may be placed in a proper position for the present device to actuate a given model of a moving picture camera.

A helical spring 44, wound upon the bar 36, abuts against a sleeve 45 on the bar and against the bearing 38, tending to draw the bar 36 to the left in Fig. 1. Suitable cushion means 46 may be arranged against a head 47 of the bearing 37 (which extends through the lug 40).

A bell crank 48 is pivoted on a shaft 49 mounted on the plate 9. The bell crank 48 has a looped head 50, which is disposed between the sleeve 45 and the cushion 46. Thus, when the bell crank 48 is rocked in a clockwise direction, as shown in Figs. 3–5, it causes the bar 36 to move forward to a shutter-mechanism actuating position. Fig. 4 shows the beginning of the swinging movement of the bell crank 48 in a clockwise direction and the beginning of the movement of the bar 36 to the right in said figure. Fig. 5 shows the bell crank 48 substantially at the end of its clockwise movement, and the bar 36 is shown substantially at its greatest advanced position, in Fig. 5. The cam 35 rotates from the position shown in Fig. 4 to the position shown in Fig. 5, effecting movement of the bell crank 48 from the position shown in Fig. 4 to the position shown in Fig. 5.

Since the cam 35 is fixed on the shaft 18, it is necessary to permit a winding of the cam 35 in a clockwise direction. To permit this without moving the bell crank 48, a pivoted arm 51 is mounted to swing on the shaft 49. A spring 52 has its ends connected with the bell crank 48 and with the arm 51 and tends to swing the arm 51 in a clockwise direction, as shown in Fig. 3.

A lateral lug 53 on the lower bell arm of the bell crank 48, provides a stop for the swinging movement of the arm 51 in a clockwise direction. A laterally engaging ear 54 on the arm 51 is engaged by the faces of the cam 35. The faces of the cam 35 do not directly engage the bell crank 48.

The above described connections of the arm 51 permit the spring 13 to be wound by rotation of the shaft 18 in a clockwise direction, as shown in Fig. 3 to Fig. 5, and by movement of the shaft 18 and cam 35 in a counter-clockwise direction causes rocking movement of the bell crank 48.

A timing wheel 55 is loosely mounted upon the shaft 18. The wheel 55 has radial lugs 56. A dog 57 pivoted on the wheel 55 engages a ratchet 58 fastened on the shaft 18. A spring 59 tends to urge the dog 57 into engagement with the ratchet 58. The teeth of the ratchet 58 and the dog 57 are so arranged that rotation of the shaft 18, under influence of the spring 13, rotates the wheel 55 in a counter-clockwise direction, as shown in Fig. 1. A spring stop 60 permits the lugs 56 to pass when the wheel 55 is rotating in a counter-clockwise direction, but provides an abutment to prevent retrograde movement of the wheel 55 in the opposite direction.

A rocker 61 mounted on a pivot 62 carries a contact 63 at one end, and a lug engaging flange 64 at the opposite side of the pivot. The flange 64 is arranged to be engaged by the lugs 56 during rotation of the wheel 55. When one of the lugs 56 engages the flange 64, the rocker is moved to a position in which the contact 63 is out of engagement with a relatively fixed contact 64. The contact 64 is connected to a binding post 65 that is insulated from the plate 9. A wire 66 connects the binding post 65 with a binding post 67.

One wire 68 from the binding post 67 connects with a source of electrical current 69, such as a dry cell battery. The other wire 70, leading from the binding post 67, connects with one side of a manual switch 71. The wire 72 connecting with the opposite side of the manual switch 71 is grounded on the plate 9, as suggested at 73.

The solenoid is connected by means of a wire 74 with a binding post 75 that is insulated from the plate 9. A wire 76 connects the binding post 75 with the other side of the electrical source 69.

In the operation of my invention, the present mechanism is mounted upon the camera, or upon the support for a camera, by any suitable means. The hood 43 is adjusted to its desired position with respect to a particular model of camera.

It is to be understood that the wires 70 and 72 are of considerable length in order that the operator may hold the manual switch 71 in his hand at some distance from the camera. The operator may of course be in the picture himself.

When it is desired to operate the camera, the person holding the switch 71 manually closes such switch. This closes a circuit for the solenoid 32. The circuit that is to be closed comprises the battery 69 (which is preferably a small, portable, dry cell battery), wire 68, wire 70, the switch 71, wire 72, and by means of the conductive plate 9 to a wire 80 that connects with the solenoid.

Upon energizing the solenoid 32, it attracts the armature 27, thus releasing the escapement catch 24. The energy stored up in the coil spring 13 thereupon drives the shaft 18 in a counter-clockwise direction, as shown in Fig. 1. Since the wheel 55 is operatively connected to rotate with the shaft 18 in said direction, the lug 56 that is holding the contact 63 in an open position by means of the rocker 61 will be moved away from the plate 64. A spring 81 thereupon closes the contacts 63, 64. After this point the manual switch 71 may be released, but nevertheless the mechanism will complete a cycle of operation.

After the contacts 63, 64 are closed, the circuit which energizes the solenoid 32 is as follows:

The source of electrical energy 69, wire 68, binding post 67, wire 66, binding post 65, contacts 64 and 63, rocker 61, and pin 62, which is grounded on the plate 9, as shown at 82, and wire 80 to the solenoid 32. It will be noticed that this latter circuit excludes the manual switch 71, so that it may be released without interfering with the operation, once the engaged lug 56 moves away from the plate 64.

When the next lug 56 engages the plate 64, the rocker 61 is moved against the action of the spring 81, thus separating the contacts 63 and 64. When the circuit is thus broken, the solenoid 32 is de-energized and the spring 30 moves the trigger 26 to an impeding position with respect to the escapement catch 24, thus stopping further operation of the mechanism.

Rotation of the shaft 18, as described, has caused movement of the cam 35 from the position shown in Fig. 4, to the position shown in Fig. 5, thus advancing the plunger head 42, to operate the shutter of the moving picture camera. Upon continued movement of the cam 35 in a counter-clockwise direction, as indicated in Fig. 5, the bell crank 48 is released, thus permitting the spring 44 to return the reciprocating bar 36 to the position shown in Fig. 1.

Of course, winding of the coil spring 13 is in the opposite direction, to wit, in a clockwise direction, as shown in Fig. 3. In order that the cam 35 may pass the lower arm of the bell crank 48, an auxiliary, swinging arm 51 is provided, which permits the cam 35 to slip past same during winding, as suggested in Fig. 3. The arm 51 and the bell crank 48 operate as a unit when the bell crank 48 is rocked as shown in Fig. 5.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a remote control apparatus for moving picture cameras, a movable operating element, a bell crank arranged to effect movement of said element to an operating position, windable, coiled spring means, cam means connected to be operated by the spring means and in turn disposed to actuate the bell crank, escapement means connected to control the release of the spring means, means connected to maintain the escapement means in check, a star wheel connected to be rotated by the spring means as it is successively released, a circuit breaker arranged to be moved to an open position by the fingers on the wheel, spring means tending to move the circuit breaker to a closed position when the wheel is rotated, two electrical circuits, manual switch means connected to control one of the circuits at a distance from the operating element, the circuit breaker controlling the other circuit, and electrical means connected to be actuated by current in either circuit to release the check means.

2. In a remote control apparatus for moving picture cameras, a movable operating element, two electrical circuits, manual switch means connected to control one of said circuits, an operating spring mechanism arranged to effect movement of said element to an operating position, electrically controlled means normally checking movement of said operating mechanism and connected to be actuated by current in either circuit to release said mechanism for operation when either circuit is closed, and means actuated by said operating mechanism and effective during operation thereof to initially automatically close the second circuit and subsequently automatically open said second circuit after closure of the manual switch means.

3. In a remote control apparatus for moving picture cameras, a movable operating element, two electrical circuits, manual switch means connected to control one of said circuits, an operating spring mechanism arranged to effect movement of said element to an operating position, electrically controlled means normally checking movement of said operating mechanism and connected to be actuated by current in either circuit to release said mechanism for operation when either circuit is closed, a spring controlled switch for closing said second circuit, and a member rotating with said operating mechanism having spaced peripheral projections effectively to successively actuate the said spring controlled switch to effect closing and opening movements of the switch at the beginning and end of each manually initiated movement of the operating mechanism.

JAMES C. BARR.